Oct. 2, 1956  H. J. HERSEY, JR  2,765,048
RIGID FILTER WITH REVERSE JET CLEANING DEVICE
Filed May 7, 1954  2 Sheets-Sheet 1

INVENTOR.
H. J. HERSEY, JR.
BY James D. Bock
ATTORNEY

Oct. 2, 1956   H. J. HERSEY, JR   2,765,048
RIGID FILTER WITH REVERSE JET CLEANING DEVICE
Filed May 7, 1954                          2 Sheets-Sheet 2
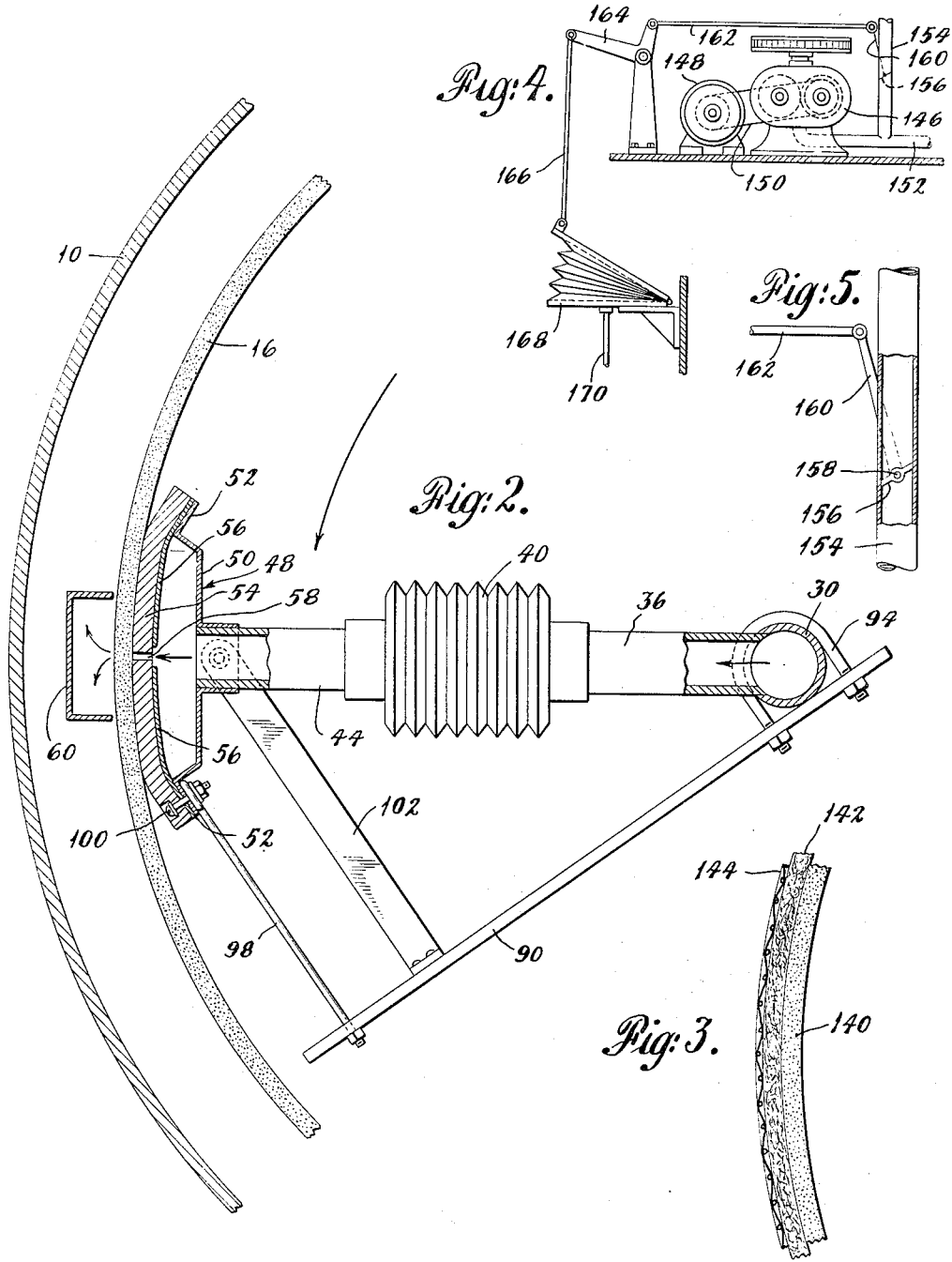
INVENTOR.
H. J. HERSEY, JR.
BY
James D. Bock
ATTORNEY

United States Patent Office 2,765,048
Patented Oct. 2, 1956

2,765,048

RIGID FILTER WITH REVERSE JET CLEANING DEVICE

Henry J. Hersey, Jr., Chatham, N. J.

Application May 7, 1954, Serial No. 428,241

9 Claims. (Cl. 183—61)

The present invention relates to filters of the type ordinarily identified as dust filters for separating particles such as dust, smoke fume and the like from air or other gases or gaseous materials in which such particles may be suspended. The apparatus chosen for an illustrative embodiment of this invention may be generally similar to that disclosed in my Patent 2,559,428, granted July 3, 1951, and it may incorporate features disclosed in my copending application Serial Number 428,242, filed May 7, 1954. In particular, the present invention provides a reverse jet cleaning device especially designed for use with filter mediums which are inherently rigid, such as porous metals or ceramics, or with fragile filter mediums supported upon rigid bodies of porous or perforate material.

In said Patent 2,559,428 the reverse jet cleaning device includes a blow tube having a small orifice which is moved progressively over the downstream, or clean, surface of the filter medium to project a jet of cleaning air through the medium to dislodge accumulated particles from the upstream side of the filter medium. With flexible, rugged filter mediums, such as wool felts, the blow tube may be rubbed on the filter medium with very little harmful effect and tight contact with the orifice may be maintained by the pressure of the incoming dust-laden gas on the upstream side, all as disclosed in said Patent 2,559,428. When a rigid structure is used as a filter medium or as a support for a fragile medium a different form of blow tube must be used to insure proper contact between the orifice and the medium while permitting the blow tube to be moved over the surface to progressively clean the entire filter medium. A blow tube meeting these requirements is disclosed herein.

Porous metal is ordinarily formed by sintering or otherwise bonding particles of metal together into a highly porous structure having interstices of sizes determined by the size of metal particles from which the structure is formed. The present invention makes it practical to use large sheets or cylinders of such porous metal to filter dust laden gases. Such material is particularly useful in connection with hot gases where the temperature involved may be so high as to damage more conventional filter materials such as wool felt. Also, such porous metal filters may be made from bronze or stainless steel or other metal having special characteristics and thus may be used to filter gases containing corrosive or caustic agents.

Glass wool, for example, is a corrosion and temperature resistant material with useful filtering characteristics and available in fiber sizes of from 1.5 to 5.0 microns as compared with natural wool which has an average fiber size ranging from about 20 to about 50 microns. Glass wool comprises bats of relatively loosely associated fibers which do not felt like wool fibers, and such bats are almost entirely devoid of structural strength and resistance to rubbing. I have found, however, that glass wool may be supported upon a rigid structure made of inherently porous materials or materials made porous by perforation and that cleaning operations which are essential in any filter of the general type herein involved may be carried out by projecting a jet of cleaning gas through the porous support from the side opposite that on which the glass wool is supported.

Modulation of the volume of cleaning air to avoid overcleaning while maintaining adequate filtering capacity is also an important part of this invention. While wool felt is a fairly effective filter medium even when brand new and completely clean, many porous metal and glass wool bats are quite ineffective when first put into operation to detain a high percentage of relatively small particles. However, in both porous metal and glass wool bats, for example, the passageways formed by interconnecting interstices are extremely tortuous and it has been found that such particles as are detained in such passageways will soon build up to a point where efficient particle detention is thereafter secured. After continued operation the particle deposit will become so great as to reduce the porosity to gas below a point desired for operation and cleaning is indicated. For continuous filtering at the very high efficiencies contemplated in the present invention, it is necessary to clean the filter medium without removing therefrom sufficient of the particles to permit it to leak a large percentage of the smaller particles when it is again put into operation. The principles of said application Serial Number 428,242 have been adapted to the present invention.

It is an object of the present invention to provide a filter capable of operation under high temperature or with corrosive gases or particles and which may be kept in continuous operation and maintained in substantially ideal condition insofar as filtering capacity and particle retention efficiency are concerned. Other and further objects will become apparent upon a consideration of the following detailed disclosure of preferred, but not necessarily the only, forms of the present invention taken in connection with the drawings forming a part of this specification.

In the drawings:

Fig. 2 is a fragmentary horizontal section taken along the line 2—2 in Fig. 1;

Fig. 3 is a fragmentary sectional view similar to Fig. 2 and illustrating a modified form of the filter medium;

Fig. 4 is a fragmentary view similar to Fig. 1 and showing a modified form of apparatus; and Fig. 5 is a fragmentary enlarged detailed view of certain parts shown in Fig. 4.

Figure 1:
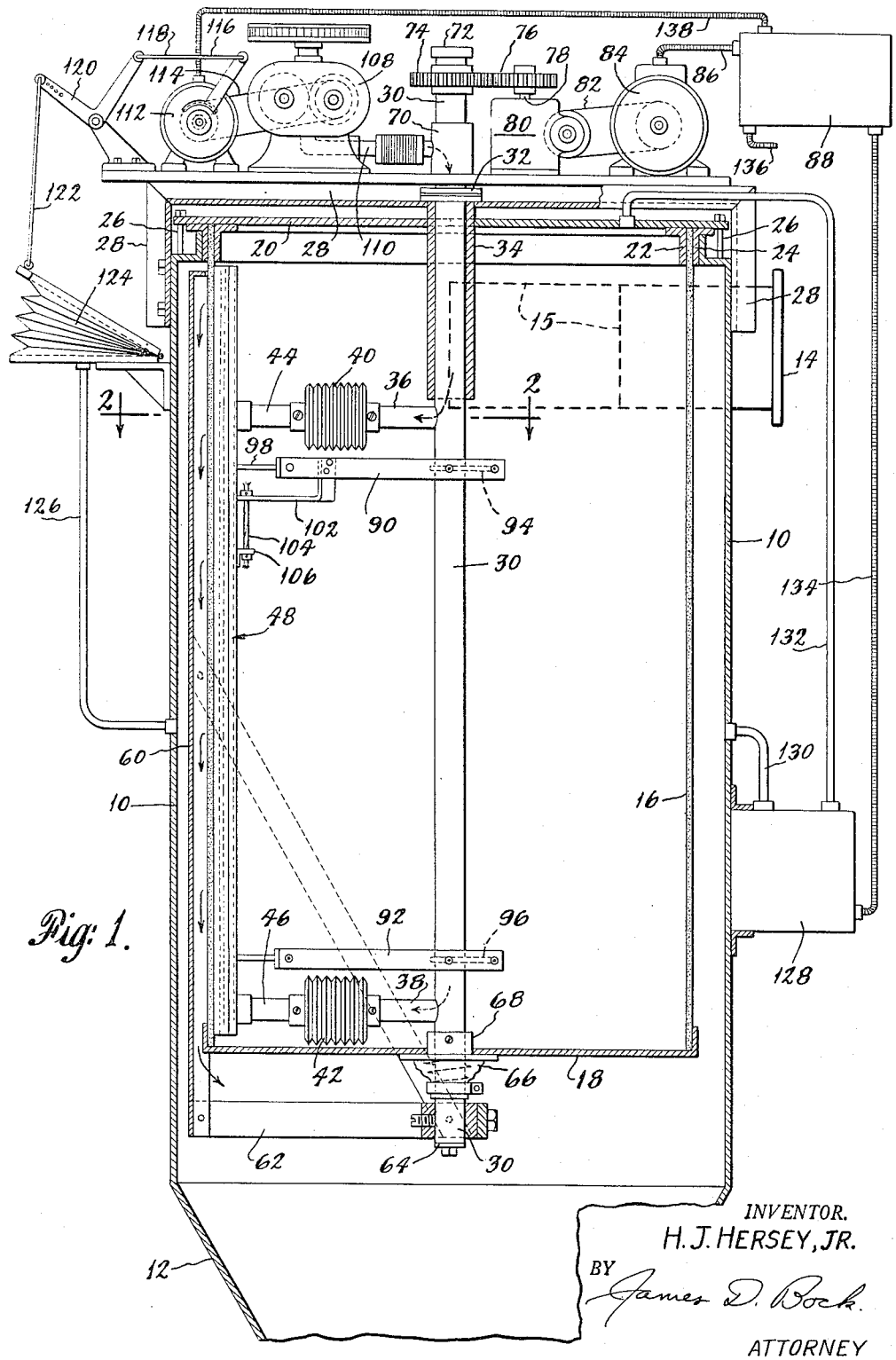
Fig. 1 is a vertical sectional view of a filter unit embodying the present invention.

In Figs. 1 and 2, a filter unit is illustrated in which the filter medium comprises a rigid cylindrical body made, for example, from porous metal or porous ceramic material. Either of these materials may be formed with interstices of predetermined size to meet specific filtering requirements. They are particularly desirable where corrosive gases or particles are encountered because suitably resistant metal or ceramic materials may be selected. Also, they are desirable where high temperatures may make the use of conventional filter mediums such as wool felts impractical.

A generally cylindrical airtight enclosure 10 having a hopper 12 is provided to enclose the apparatus. An inlet is provided for incoming particle-laden gas comprising a conduit 14 which opens at 15 into the upper portion of the enclosure 10. The conduit 14 may have any suitable cross-section and it preferably intersects the cylindrical body 10 in such manner as to provide an opening 15 of approximately the same area as the conduit 14 and arranged so that the gas will enter the cylindrical body 10 in a generally tangential direction. A filter medium 16 is supported within the enclosure 10 and is of cylindrical conformation having a diameter somewhat less than that of the body 10. The filter medium 16 is enclosed at the bottom by a disk 18 and is partially enclosed at the top by a plate or disk 20 which is provided with suitable openings (not shown) for communication with the atmosphere or at least with the particular atmosphere immediately surrounding the body 10. The particle-laden gas entering the conduit 14 thus swirls around in the space between the enclosure 10 and the outer surface of the filter medium 16 and the gas passes through the filter medium for escape through the openings in plate 20 while the particles are detained by the filter medium 16.

The filter medium 16 is made up of a rigid porous material such as porous metal or porous ceramic. Preferably the inner surface thereof is made as smooth as reasonably practicable as by grinding or machining. The outer surface need not be especially treated. This filter medium is secured at its upper end between rings 22 and 24. The ring 24 is preferably flanged so as to rest upon the upper edge of the enclosure 10 and the plate 20 may be extended beyond the flange of ring 24 and perforated to receive bolts 26 for securing the assembly upon the enclosure 10. A frame 28 is secured to the upper end of the enclosure 10 and serves to support suitable apparatus for moving and supplying air to the reverse jet cleaning device described hereinbelow.

A hollow central drive shaft 30 extends vertically along the axis of the cylindrical filter medium 16 and extends upwardly through the plate 20 where it is supported by a thrust bearing 32 resting upon the frame 28. Preferably, also an elongated sleeve bearing 34 extends downwardly from the thrust bearing 32 to impart lateral stability to the central shaft 30 while permitting it to rotate about its longitudinal axis. Hollow arms 36 and 38 are secured to the hollow shaft 30 and communicate therewith near the upper and lower ends thereof. Spring bellows 40 and 42 are positioned on the arms 36 and 38, respectively, and carry extension tubes 44 and 46 aligned with the arms 36 and 38. The tubes 44 and 46 communicate with the hollow interior of a blow tube indicated generally at 48 which extends vertically substantially the full height of the inner surface of the cylindrical filter medium 16. The spring bellows 40 and 42 are of the expansive type and thus urge the blow tube 48 into engagement with the filter medium 16 while serving to establish communication between the blow tube 48 and the hollow central shaft 30.

Referring now to Fig. 2, the blow tube 48 comprises a channel-shaped body 50 secured to the tube 44 at the upper end and to the tube 46 at the lower end and which is provided with angularly disposed flanges 52. A strip of flexible material 54 is secured to the flanges 52 in such manner as to tend to bow outwardly on a radius considerably smaller than the radius of the cylindrical filter medium 16. The flexible material 54 is preferably a tough, heat-resistant material such as automobile brake lining. A plurality of leaf springs 56 may be positioned between the flexible material 54 and the flanges 52 to enhance the tendency of the material to bulge outwardly as disclosed above. As shown in Fig. 2 the expansive bellows 40 and 42 serve to press the blow tube 48 firmly against the inner surface of the filter medium 16 flattening the flexible material 54 thereagainst so that an extensive area thereof is brought into intimate contact with the filter medium.

An orifice 58 comprising a long, narrow slot extending substantially the full length of the flexible strip 54 is formed centrally of the strip and communicates with the hollow interior of the blow tube 48. When the blow tube 48 is pressed into engagement with the filter medium 16, as shown in Fig. 2, the orifice 58 will be in intimate contact with the inner surface of the filter medium and the flattened lateral areas of the flexible strip will prevent escape of air transversely of the orifice. The gaseous pressure on the cleaning air supplied to the blow tube 48 will further press the lateral areas against the smooth downstream surface of the porous filter medium 16 to enhance the interfacial seal.

Preferably a receiver 60 is positioned on the upstream side of the filter medium opposite the orifice 58. The receiver 60 may comprise a channel arranged in close proximity to but out of contact with the filter medium. The receiver 60 provides a quiet zone in which dislodged particles are isolated from the swirling body of dust laden gas. Such particles may gravitate to the bottom of the filter and to the hopper 12 without substantial tendency toward being redeposited on the filter medium 16. The receiver 60 (see Fig. 1) is supported at its lower end by an arm 62 fixed to the lower end of the hollow central shaft 30. The position of the arm 62 relative to the hollow arms 36 and 38 is such as to maintain the receiver opposite the orifice 58 of blow tube 48 during rotation thereof as will be described. The hollow tube 30 is closed at its lower end by a plug 64 and a dustproof seal 66 is preferably arranged between the hollow central shaft 30 and the outer surface of the bottom closure disk 18 to prevent ingress of dust-laden air through the bearing 68.

Movement of the blow tube 48 and receiver 60 for progressive cleaning of the entire area of the filter medium 16 is achieved by rotating the hollow central shaft 30. A feature of the present invention is the provision of a special linkage between the shaft 30 and the blow tube 48 which facilitates such movement while maintaining a tight seal between the blow tube 48 and the inner, or downstream, side of the filter medium 16. The hollow shaft 30 extends through a hollow bearing 70 on the upper frame 28 through which it communicates with a blower to be described. Above the bearing 70 the shaft 30 is closed by a plug 72 and carries a gear 74 which meshes with a gear 76 fixed upon the low speed shaft 78 of a speed reducer 80 which is driven through a belt 82 and motor 84. Preferably the hollow shaft 30 rotates at a relatively low speed only during such time as cleaning progresses. Thus the motor 84 is connected by a cable 86 with a starting box 88 which serves also to control operation of the air supplying means to be described.

The expansive spring bellows 40 and 42, described above, are not relied upon for moving the blow tube 48 when the shaft 30 is rotated. Instead, the shaft 30 carries supplementary arms 90 and 92 secured to the shaft 30 by U-bolts 94 and 96, respectively. In Fig. 2 it will be observed that the mechanism is arranged to rotate in a counter-clockwise direction. The arms 90 and 92 are angularly disposed ahead of the blow tube 48. A link 98 which may comprise a relatively thin rod or flexible cable, extends from the arm 90 to the leading edge of the blow tube 48 to which it is secured as by a nut and bolt 100 passing through the flange 52. Counterclockwise rotation of the hollow central shaft 30 will thus be imparted to the blow tube 48 through the arm 90 and link 98 whereby the blow tube will be dragged along the surface of the filter medium 16 much as a sleigh is dragged over snow. Since the blow tube is curved inwardly away from the filter medium 16 and is lifted along its leading edge by the link 98, there will be no tendency for the flexible brake-lining material 54 to "dig in" the surface of the filter medium 16. This construction is particularly important when it is considered that a considerable amount of friction must be exerted by the brake lining material against the filter medium in order to seal the orifice 58.

The blow tube 48 receives vertical support through an arm 102 secured to the arm 90 and extending into proximity with the blow tube 48. A flexible cable 104 is secured at the free end of the arm 102 and extends downwardly where it is secured to a bracket 106 on the blow tube 48. The construction just described serves to support the blow tube 48 vertically without interfering with the smooth operation of the linkage for dragging the blow tube along the surface of the filter medium 16.

Cleaning gas, ordinarily compressed air, is supplied to the blow tube 48 when a cleaning cycle is initiated. As shown in Fig. 1, a blower 108, preferably of the positive pressure type, is positioned on the upper frame 28 and communicates through line 110 with the hollow interior of the bearing 70 and thus with the interior of the hollow central shaft 30 and the blow tube 48. In some installations it may be satisfactory to supply a constant volume of air to the blow tube 48 in each cleaning cycle but in many instances, particularly where changing conditions of dust load, humidity or the like can be expected, it will be preferred to utilize the modulation feature disclosed and claimed in my application Serial No. 428,242. Thus in the present disclosure, I have shown a variable speed motor 112 for driving the blower 108 through a belt 114. The variable speed motor 112 is provided with a speed control lever 116 which is connected through a link 118, bell crank 120 and link 122 with a bellows 124. The interior of bellows 124 communicates through a line 126 with the high pressure zone or upstream side of the filter. The bellows 124 is preferably weighted so that it will not expand until a predetermined pressure is reached and thereafter will expand proportionately to further increases, all as described in detail in my said application Serial No. 428,242. As shown in Fig. 1, the bellows 124 is expanded to substantially its maximum extent and the speed control lever 116 of motor 112 has thus been advanced to maximum speed position. This is a combination which would occur under extremely heavy dust loads or other conditions which require maximum cleaning effort.

Initiation of operation of the reverse jet cleaning device herein described is preferably in response to a predetermined increase in differential in gaseous pressure between the upstream and downstream sides of the filter medium. Thus, as particles continue to accumulate upon the filter medium 16, it will become increasingly difficult for the gas to flow through the filter medium and the pressure on the upstream side will rise relative to that on the downstream side. When the accumulation becomes such as to reduce the filtering capacity below a desired value, cleaning of the filter should be initiated. For example, cleaning might be initiated when the differential reaches a pressure equivalent to 4" of water and might be terminated when the differential has been reduced to about 3" of water. A pressure sensitive switch 128 may be secured to the filter unit and may communicate through a line 130 with the upstream side of the filter and through a line 132 with the downstream side of the filter or with the atmosphere in a case such as that disclosed wherein the cover plate 20 opens directly to the atmosphere. Preferably, the pressure switch 128 is of the type disclosed in my copending application Serial No. 428,242 and is arranged to energize, through a cable 134, the magnetic starter 88. The starter 88 is connected through a cable 136 with a suitable current source (not shown) and is connected by a cable 138 with the variable speed motor 112.

When the filter is in operation and the predetermined differential in upstream and downstream pressure is reached, the switch 128 will be closed to energize the starting box 88 which in turn will start the motors 84 and 112. Cleaning ensues during which compressed air is supplied to the blow tube 48 and the blow tube is rotated to progressively dislodge accumulated particles from the entire area of the filter medium. When a sufficient quantity of accumulated particles has been removed to lower the differential in upstream and downstream pressure to the desired point, the switch 128 will operate to deenergize the starter 88 and motors 84 and 112. Preferably the bellows 124 will not start to expand unless the differential in pressure continues to rise after cleaning is initiated. Preferably, also, the amount of cleaning air supplied by the blower 108 when running at minimum speed is less than enough to dislodge sufficient particles to start lowering of the differential under average conditions for any particular installation. Thus, overcleaning is avoided under lighter-than-average conditions. Under average conditions the bellows 108 will expand somewhat and the amount of air will be increased. Under heavier-than-average conditions the bellows 108 may expand to the maximum extent. The severity of the cleaning operation is therefore modulated in accordance with the demand over a considerable range of changing conditions and the filter medium 16 is maintained very close to optimum density.

In Fig. 3 there is shown an alternative form of filter medium with which the present invention is particularly useful. In said figure the filter medium assembly is made up of a rigid porous cylinder 140 which may be made from porous metal, porous ceramic or from sheet metal which has been perforated or slit and expanded to form a rigid screenlike body. The rigid body 140 supports a filter medium 142 which may comprise a batting of glass wool fiber or a felt or layer of relatively fragile material. With certain of the materials of this general category, it is advisable to provide means for binding the filter medium against the rigid porous body 140. For example, when a glass wool batting is used as the filter medium 142 it has been found advisable to enclose the medium in a wire screen 144 which will serve to hold the filter medium in place and to protect it from disruption when the reverse jet cleaning apparatus is put into operation. When a filter medium such as that disclosed in Fig. 3 is employed in the present invention, the particles will be detained by the glass wool or similar filter medium 142 and when cleaning is indicated, the reverse jet apparatus of Figs. 1 and 2 will be placed in operation to project a relatively concentrated jet of cleaning air through the porous or perforated body 140 and through the filter medium 142 to rearrange and to dislodge a portion of the accumulated particles. This particular modification of the invention makes it possible to secure the advantages of reverse jet cleaning with fragile filter mediums which could not be used in filters such as those disclosed in my Patents 2,495,635 and 2,559,428, for example.

In Figs. 4 and 5 there is illustrated a modification of the apparatus for varying the amount of cleaning air supplied to the reverse jet. In this modification the blower 146 may be driven by a constant speed motor 148 through a belt 150 and the amount of cleaning air is modulated by a bleeder valve which will divert varying quantities of the cleaning air to the atmosphere. Thus, the compressed air from blower 146 is conducted through a line 152 to the hollow central shaft 30 of the filter unit described hereinabove. A branch line 154 connects with the line 152 at one end and may open to the atmosphere at the other. An adjustable valve 156 is pivoted on a shaft 158 (see Fig. 5) in the line 154. The shaft 158 carries a lever 160 which is connected through a link 162, bell crank 164 and link 166 with a bellows 168 which may be identical with the bellows 124 described hereinabove. The bellows 168 is connected by a line 170 with the high pressure zone of the filter unit. In the position of the parts illustrated in Figs. 4 and 5, it is assumed that an extremely heavy accumulation of particles has been encountered and bellows 168 is substantially fully expanded. Thus, through the linkage described above, the valve 156 has been closed so that the full quantity of air compressed by the blower 146 will be delivered to the reverse jet cleaning device. Under lighter loads the bellows 168 will not become so fully expanded and the valve 156 will remain open in varying degrees to divert varying quantities of air to the atmosphere with proportionate reduction in the quantity of air delivered to the reverse jet.

I claim:
1. In a filter for separating particles from a gas, the combination of a filter medium assembly having an upstream and a rigid substantially smooth porous downstream surface, means for supplying particle-laden gas to the upstream side of said filter medium under pressure greater than that on the downstream side, said particles being detained by said filter medium assembly as said gas passes therethrough, reverse-jet cleaning means for removing accumulated particles from said filter medium assembly comprising an elongated hollow member hav- ing an elongated flexible wall substantially impervious to said gas and presented toward said downstream surface, said flexible wall having an elongated orifice spaced from either side thereof and of a length substantially equal to the extent of said downstream surface in one direction, said orifice opening toward said downstream surface with the interior of said hollow member communicating with said downstream surface through said orifice, means for supplying a cleaning gas under a pressure substantially greater than that on the upstream surface of said filter medium assembly to said hollow member for discharge through said orifice and said filter medium assembly to remove particles from the latter, the pressure of said cleaning gas being effective to yieldably bulge said flexible wall transversely of said orifice means for urging said flexible wall against said downstream surface to overcome the tendency of said flexible wall to bulge and thus to flatten it into extensive contact with said downstream surface of both sides of said orifice thereby preventing passage of cleaning gas along the interface formed between said downstream surface and said flexible wall, and means for moving said hollow member and said filter medium assembly relative to each other in a direction substantially transverse to said one direction and substantially parallel to said downstream surface to dislodge particles from substantially the entire area of said filter medium assembly.

2. In a filter for separating particles from a gas, the combination of a filter medium assembly having an upstream and a rigid substantially smooth porous downstream surface, means for supplying particle-laden gas to the upstream side of said filter medium under pressure greater than that on the downstream side, said particles being detained by said filter medium assembly as said gas passes therethrough, reverse-jet cleaning means for removing accumulated particles from said filter medium assembly comprising an elongated outwardly flanged member substantially dish-shaped in transverse cross-section, an elongated flexible member substantially impervious to said gas and connected along opposite side portions thereof to said outwardly flanged member and forming therewith a substantially closed hollow member having a leading and trailing edge portion, said flexible member being presented toward said downstream surface and having an elongated orifice formed therethrough spaced from either side thereof and of a length substantially equal to the extent of said downstream surface in one direction, the interior of said hollow member communicating with a narrow elongated portion of said downstream surface through said orifice, means for supplying a cleaning gas under a pressure substantially greater than that on the upstream side of said filter medium assembly to said hollow member for discharge through said orifice and said filter medium assembly to remove particles from the latter, means yieldably urging said flexible member to assume a conformation bulged transversely of said orifice and toward said downstream surface, means for yieldably urging said flexible member into flattened extensive contact with said downstream surface about said orifice thereby preventing passage of cleaning gas along the interface formed between said downstream surface and said flexible member, and means connected to said leading side portion of said hollow member for moving the same along a path parallel to said downstream surface and substantially transverse to said one direction to dislodge particles from substantially the entire area of said filter medium assembly.

3. In a filter as set forth in claim 2 wherein at least the portion of said filter medium assembly forming said downstream surface is of rigid material porous to said gas and forming a substantially smooth slideway engaged by said flexible member.

4. In a filter as set forth in claim 2 wherein said filter medium assembly includes a rigid member of material porous to said gas forming the downstream surface of said filter medium assembly, and relatively fragile filter material supported on and extending over the upstream side of said rigid member.

5. In a filter as set forth in claim 2 wherein said filter medium assembly comprises rigid filter material porous to said gas, and said downstream surface is formed by a substantially smooth surface of said rigid filter material.

6. In a filter for separating particles from a gas the combination of a substantially cylindrical filter medium made of rigid porous material, means for supplying particle-laden gas to the upstream side of said filter medium under gaseous pressure greater than that on the downstream side whereby particles are detained by said filter medium, a reverse-jet cleaning device for removing a portion of the accumulated particles from said filter medium comprising an elongated hollow member having a flexible wall of impervious material with an elongated narrow orifice of a length substantially equal to the vertical dimension of the surface of said filter medium on the downstream side thereof, said flexible wall being yieldably urged toward a conformation which is bulged transversely of said orifice to a curvature having a radius smaller than the radius of curvature of the inner surface of said cylindrical filter medium, means yieldably urging said hollow member against the inner surface of said filter medium with said flexible wall flattened into extensive contact with said inner surface laterally in both directions of said orifice, means for applying air under pressure substantially greater than that on the upstream side of said filter medium to said hollow member for discharge through said orifice and said filter medium to dislodge particles from the latter, and means for progressively moving said hollow member laterally of said orifice and across the inner surface of said filter medium to dislodge particles from substantially the entire area of said filter medium.

7. In a filter for separating particles from a gas, the combination of a substantially cylindrical filter medium assembly having opposite surfaces forming the upstream and downstream sides respectively of said filter medium assembly, said downstream surface being rigid and forming a slideway, means for supplying particle-laden gas to the upstream side of said assembly under pressure greater than that on the downstream side, said particles being detained by said filter medium assembly as said gas passes therethrough, reverse-jet cleaning means for removing accumulated particles from said filter medium assembly comprising an elongated outwardly flanged member substantially dish-shaped in transverse cross-section, an elongated flexible member substantially impervious to said gas and connected along the opposite side portions thereof to said outwardly flanged member and forming therewith a substantially closed hollow member having a leading and trailing edge portion, said flexible member being presented toward said downstream surface and having an elongated orifice formed therethrough spaced from either side thereof and of a length substantially equal to the axial extent of said downstream surface, the interior of said hollow member communicating with a narrow elongated portion of said downstream surface through said orifice, means for supplying a cleaning gas under a pressure substantially greater than that on the upstream side of said filter medium assembly to said hollow member for discharge through said orifice and said filter medium assembly to remove particles from the latter, means yieldably urging said flexible member to assume a conformation bulged transversely of said orifice and toward said downstream surface means supporting said hollow member substantially parallel to the axis of said cylindrical filter medium assembly and yieldably urging said flexible member into flattened extensive contact with said downstream surface about said orifice thereby preventing passage of cleaning gas along the interface formed between said downstream surface and said flexible member, and means connected to said leading side portion of said hollow member for moving the same progressively and circumferentially along the slideway formed by said downstream surface to dislodge particles from substantially the entire area of said filter medium assembly.

8. In a filter for separating particles from a gas, the combination of a substantially cylindrical filter medium assembly having opposite surfaces forming the upstream and downstream sides respectively of said filter medium assembly, said downstream surface being rigid and forming a slideway, means for supplying particle-laden gas to the upstream side of said assembly under pressure greater than that on the downstream side, said particles being detained by said filter medium assembly as said gas passes therethrough, reverse-jet cleaning means for removing accumulated particles from said filter medium assembly comprising an elongated outwardly flanged member substantially dish-shaped in transverse cross-section, an elongated flexible member substantially impervious to said gas and connected along the opposite side portions thereof to said outwardly flanged member and forming therewith a substantially closed hollow member having a leading and trailing edge portion, said flexible member being presented toward said downstream surface and having an elongated orifice formed therethrough spaced from either side thereof and of a length substantially equal to the axial extent of said downstream surface, the interior of said hollow member communicating with a narrow elongated portion of said downstream surface through said orifice, a hollow shaft rotatably and coaxially mounted with said cylindrical filter medium assembly, tubular linkage having one end portion connected to said hollow shaft and communicating interiorly therewith, the other end portion of said tubular linkage being connected to and communicating interiorly with said hollow member, said tubular linkage including a resilient tubular member urging said hollow member toward said downstream surface and said flexible member against and into extensive contact with said downstream surface about said orifice thereby preventing passage of cleaning gas along the interface formed between said downstream surface and said flexible member, means for supplying a cleaning gas under a pressure substantially greater than that on the upstream side of said filter medium assembly to said hollow shaft for discharge through said linkage, hollow member, orifice and said filter medium assembly to remove particles from the latter, an arm fixed to said hollow shaft and rotatable therewith, said arm extending from said hollow shaft radially in advance of said hollow member, a link connected at one end to said arm and at the other to the leading edge portion of said hollow member at a point adjacent said downstream surface, and means for rotating said hollow shaft.

9. In a filter for separating particles from a gas, the combination of a substantially cylindrical filter medium assembly having opposite surfaces forming the upstream and downstream sides respectively of said filter medium assembly, said downstream surface being rigid and forming a slideway, means for supplying particle-laden gas to the upstream side of said assembly under pressure greater than that on the downstream side, said particles being detained by said filter medium assembly as said gas passes therethrough, reverse-jet cleaning means for removing accumulated particles from said filter medium assembly comprising an elongated outwardly flanged member substantially dish-shaped in transverse cross-section, an elongated flexible member substantially impervious to said gas and connected along the opposite side portions thereof to said outwardly flanged member and forming therewith a substantially closed hollow member having a leading and trailing edge portion, said flexible member being presented toward said downstream surface and having an elongated orifice formed therethrough spaced from either side thereof and of a length substantially equal to the axial extent of said downstream surface, the interior of said hollow member communicating with a narrow elongated portion of said downstream surface through said orifice, a hollow shaft rotatably and coaxially mounted with said cylindrical filter medium assembly, a pair of hollow tubular linkages each having one end portion connected to said hollow shaft and communicating interiorly therewith, the other end portions of said tubular linkages being connected to and communicating interiorly with said hollow member at opposite end portions thereof, each of said tubular linkages including a resilient tubular member urging said hollow member toward said downstream surface and said flexible member against and into extensive contact with said downstream surface about said orifice thereby preventing passage of cleaning gas along the interface formed between said downstream surface and said flexible member, means for supplying a cleaning gas under a pressure substantially greater than that on the upstream side of said filter medium assembly to said hollow shaft for discharge through said linkages, hollow member, orifice and said filter medium assembly to remove particles from the latter, an arm fixed to said hollow shaft and rotatable therewith, said arm extending from said hollow shaft radially in advance of said hollow member, a link connected at one end to said arm and at the other to the leading edge portion of said hollow member at a point adjacent said downstream surface, and means for rotating said hollow shaft.

References Cited in the file of this patent

UNITED STATES PATENTS

| | | |
|---|---|---|
| 1,043,551 | Thurman | Nov. 5, 1912 |
| 1,944,268 | Rathbun | Jan. 23, 1934 |
| 1,995,649 | Rathbun | Mar. 26, 1935 |
| 2,057,446 | Rathbun | Oct. 13, 1936 |
| 2,559,428 | Hersey | July 3, 1951 |